US010596952B2

(12) United States Patent
Yan et al.

(10) Patent No.: US 10,596,952 B2
(45) Date of Patent: Mar. 24, 2020

(54) INTELLIGENT LIGHTING SYSTEM FOR AUTOMOBILE LAMP, AUTOMOBILE LAMP ASSEMBLY AND AUTOMOBILE

(71) Applicant: HASCO VISION TECHNOLOGY CO., LTD., Shanghai (CN)

(72) Inventors: Meng Yan, Shanghai (CN); Juejing Yang, Shanghai (CN); Yunzhou Li, Shanghai (CN)

(73) Assignee: SHANGHAI KOITO AUTOMOTIVE LAMP CO., LTD., Shanghai (CN)

( * ) Notice: Subject to any disclaimer, the term of this patent is extended or adjusted under 35 U.S.C. 154(b) by 0 days.

(21) Appl. No.: 16/108,376

(22) Filed: Aug. 22, 2018

(65) Prior Publication Data

US 2019/0077303 A1 Mar. 14, 2019

(30) Foreign Application Priority Data

Sep. 13, 2017 (CN) .......................... 2017 1 0823427
Sep. 13, 2017 (CN) ..................... 2017 2 1172718 U

(51) Int. Cl.

| B60Q 1/00 | (2006.01) |
| B60Q 1/08 | (2006.01) |
| F21S 41/153 | (2018.01) |
| B60Q 1/076 | (2006.01) |
| F21S 41/33 | (2018.01) |
| F21S 41/255 | (2018.01) |
| F21S 41/143 | (2018.01) |

(Continued)

(52) U.S. Cl.
CPC ............ *B60Q 1/085* (2013.01); *B60Q 1/076* (2013.01); *F21S 41/143* (2018.01); *F21S 41/153* (2018.01); *F21S 41/255* (2018.01); *F21S 41/265* (2018.01); *F21S 41/321* (2018.01); *F21S 41/323* (2018.01); *F21S 41/334* (2018.01); *F21S 41/663* (2018.01); *F21W 2102/145* (2018.01); *F21Y 2115/10* (2016.08)

(58) Field of Classification Search
CPC ..................... F21S 41/33; F21S 41/334; F21S 41/337–338; F21S 41/151; F21S 41/153; F21S 41/25; F21S 41/663; F21S 41/323; F21S 41/321; B60Q 1/085
See application file for complete search history.

(56) References Cited

U.S. PATENT DOCUMENTS

| 4,345,308 | A | * | 8/1982 | Mouyard | ................ G09F 13/22 362/245 |
| 6,076,945 | A | * | 6/2000 | Matsubara | ........... B60Q 1/0041 362/346 |

(Continued)

*Primary Examiner* — Gerald J Sufleta, II
(74) *Attorney, Agent, or Firm* — Global IP Services; Tianhua Gu

(57) ABSTRACT

An intelligent illuminating system for a vehicle lamp comprises a lens, a circuit board, a plurality of LED light sources on the circuit board distributed in an array, and a hollow reflector disposed between the LED light sources and the lens. The hollow reflector has reflection cavities disposed in one-to-one correspondence with the LED light sources. The reflection cavity has an incident opening, an emergent opening, and a reflection surface extending between the incident opening and the emergent opening. The LED light source is disposed at the incident opening. The emergent opening is located on a focal plane of the lens or has a defocusing amount from the focal plane of the lens.

8 Claims, 5 Drawing Sheets

(51) Int. Cl.
*F21S 41/32* (2018.01)
*F21S 41/663* (2018.01)
*F21S 41/265* (2018.01)
*F21Y 115/10* (2016.01)
*F21W 102/145* (2018.01)

(56) References Cited

U.S. PATENT DOCUMENTS

| | | | | |
|---|---|---|---|---|
| 2005/0140270 A1* | 6/2005 | Henson | ............... | F21K 9/00 |
| | | | | 313/501 |
| 2011/0292658 A1* | 12/2011 | Ho | ............... | F21V 5/007 |
| | | | | 362/307 |
| 2013/0335838 A1* | 12/2013 | Cheng | ............... | G02B 7/023 |
| | | | | 359/811 |
| 2015/0085523 A1* | 3/2015 | Gurtl | ............... | F21S 41/143 |
| | | | | 362/607 |
| 2015/0124469 A1* | 5/2015 | Krenn | ............... | G02B 6/0068 |
| | | | | 362/511 |
| 2015/0226395 A1* | 8/2015 | Taudt | ............... | F21S 41/24 |
| | | | | 362/511 |
| 2015/0362144 A1* | 12/2015 | Bauer | ............... | G02B 6/0008 |
| | | | | 362/511 |
| 2016/0047966 A1* | 2/2016 | Schenkl | ............... | F25D 27/00 |
| | | | | 362/606 |
| 2017/0153000 A1* | 6/2017 | Sato | ............... | F21S 41/335 |
| 2018/0208104 A1* | 7/2018 | Kennemer | ............... | B60Q 1/0035 |
| 2018/0259156 A1* | 9/2018 | Hechtfischer | ............... | G03B 21/2013 |

* cited by examiner

INTELLIGENT LIGHTING SYSTEM FOR AUTOMOBILE LAMP, AUTOMOBILE LAMP ASSEMBLY AND AUTOMOBILE

FIELD OF INVENTION

The present invention relates to the technical field of vehicle lamps, and in particular, to an intelligent illuminating system for a vehicle lamp, a vehicle lamp assembly comprising the intelligent illuminating system for a vehicle lamp, and a vehicle comprising the vehicle lamp assembly.

DESCRIPTION OF RELATED ARTS

With the development of Light Emitting Diode (LED) technologies, LED has been widely applied to various fields. LED is also applied to an external illumination aspect of vehicles more commonly due to advantages such as low heat generation, long service life, environmental protection, quick response speed, being easily designed due to small volume, and the like.

A matrix LED self-adaptive headlamp can be used to adjust road illumination status according to the situation of other traffic participants. For example, when the matrix LED self-adaptive headlamp is applied to high beam illumination, by intelligently adjusting a light pattern, danger caused by dazzle to a driver coming from an opposite direction is avoided. In addition, desirable illumination in other areas than the area in which the coming vehicle is located is ensured. The present invention aims to provide an intelligent illuminating system for a vehicle lamp that can adjust luminance of a local area of an illuminating light pattern by controlling a light source, so as to meet a self-adaptive requirement of the headlamp.

SUMMARY OF THE PRESENT INVENTION

A technical problem to be resolved in the present invention is to provide an intelligent illuminating system for a vehicle lamp, a vehicle lamp assembly comprising the intelligent illuminating system for a vehicle lamp, and a vehicle comprising the vehicle lamp assembly that can adjust luminance of a local area of an illuminating light pattern and implement various illuminating light patterns, so as to overcome the foregoing defects in the prior art.

To resolve the foregoing technical problem, the present invention uses the following technical solutions:

An intelligent illuminating system for a vehicle lamp comprises a lens, a circuit board, a plurality of light emitting diode (LED) light sources disposed on the circuit board and distributed in an array, and a hollow reflector disposed between the plurality of LED light sources and the lens, wherein the hollow reflector is provided with a plurality of multiple reflection cavities, each of the reflection cavities is disposed in one-to-one correspondence with each of the plurality of LED light sources, the reflection cavity is provided with an incident opening, an emergent opening, and a reflection surface extending between the incident opening and the emergent opening, the LED light source is disposed at the incident opening, the emergent opening is located on a focal plane of the lens or has a defocusing amount from the focal plane of the lens, and light emitted by the LED light source is incident into the lens after being reflected by the reflection surface.

Preferably, an inner diameter of the emergent opening is greater than an inner diameter of the incident opening.

Preferably, the shapes of the incident opening and the emergent opening both are polygons.

Preferably, side surfaces in the reflection surface that are respectively located at an upper side and a lower side of the LED light source are both free-form curved surfaces.

Preferably, the free-form surface is a quasi-parabolic surface.

Preferably, the side surfaces in the reflection surfaces that are located at the upper side and/or the lower side of the LED light sources are provided with strip patterns extending along a transversal direction.

Preferably, all the LED light sources are distributed in an array and form an LED light source array, the LED light source array is provided with a plurality of rows along a transversal direction and is provided with a plurality of columns along a longitudinal direction.

Preferably, one lens or a plurality of lenses are provided.

Preferably, the lens is a balsaming lens.

A vehicle lamp assembly comprises the intelligent illuminating system for a vehicle lamp described above.

A vehicle comprises the vehicle lamp assembly described above.

Compared with the prior art, the present invention has a notable progress:

The hollow reflector is disposed between the LED light source array and the lens, and direct light with a large angle emitted by the LED light source can decrease an emergent angle after being reflected by the reflection cavity of the hollow reflector, so that more light can be incident into the lens. Each LED light source and a reflection cavity corresponding to the LED light source form a reflection unit. The LED light sources distributed in an array and the reflection cavities form a reflection unit array. Light emitted by a single reflection unit forms a flare after being transmitted by the lens. The flare may be used as a pixel spot of an integer illuminating light pattern formed after light emitted by the reflection unit array is transmitted by the lens, thus implementing pixelation of the illuminating light pattern. The flare formed after light emitted by each reflection unit is transmitted by the lens can be individually controlled by individually controlling turning on, turning off and luminance of each LED light source. Therefore, luminance of one or more local areas of an illuminating light pattern can be adjusted. In this way, various illuminating light patterns are implemented and a self-adaptive requirement of a headlamp is met. Especially, when a vehicle comes from an opposite direction, an LED light source of a reflection unit forming a flare in an area is turned off by determining the area corresponding to the coming vehicle in the illuminating light pattern. When necessary, luminance of an LED light source of a neighboring reflection unit may further be reduced. Therefore, the illuminating light pattern can be prevented from dazzling a driver of a coming vehicle, and desirable illumination in other areas than the area in which the coming vehicle is located is ensured, thereby ensuring driving safety.

BRIEF DESCRIPTION OF THE DRAWINGS

FIG. 6a is a schematic diagram of a separated structure of two reflection cavities that are vertically corresponding to each other in a hollow reflector of an intelligent illuminating system for a vehicle lamp according to an embodiment of the present invention.

FIG. 6b is a view along C-C in FIG. 6a.

Figure 1:
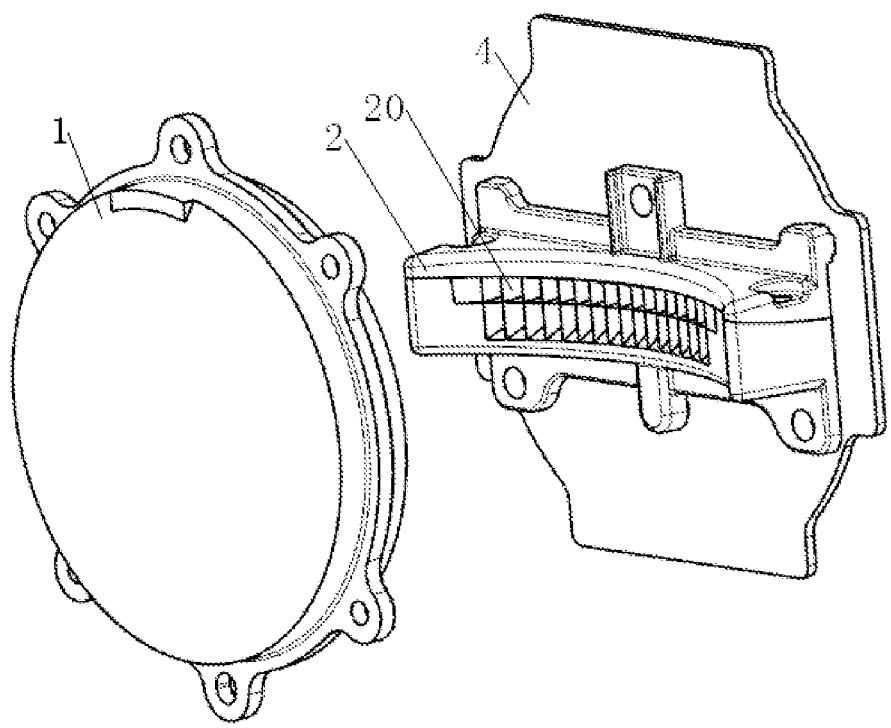
FIG. 1 is a schematic diagram of an overall structure of an intelligent illuminating system for a vehicle lamp according to an embodiment of the present invention.

In the drawings:
1: Lens; 2: Hollow reflector
20: Reflection cavity; 201: Incident opening
202: Emergent opening; 203: Reflection surface
204: Strip pattern; 3: LED light source
4: Circuit board

DETAILED DESCRIPTION OF THE PREFERRED EMBODIMENTS

Specific embodiments consistent with the present invention are further described in detail hereinafter with reference to the accompanying drawings. These embodiments are merely used for describing the present invention, instead of limiting the present invention.

In the description consistent with the present invention, it should be noted that, an orientation or position relationship indicated by a term such as "center", "longitudinally", "transversely", "above", "below", "front", "behind", "left", "right", "vertical", "horizontal", "top", "bottom", "internal", or "external" is an orientation or position relationship shown based on the accompanying drawings, and is merely for ease of description of the present invention and for simplifying the description, not for indicating or implying that an indicated apparatus or element needs to have a particular orientation and be constructed and operated in a particular orientation. Therefore, the orientation or position relationship shall not be construed as a limitation to the present invention. In addition, terms "first" and "second" are merely used for an objective of description and cannot be understood as indicating or implying relative importance. In the description consistent with the present invention, it should be noted that, unless otherwise specifically specified and defined, terms "installation", "linking", and "connection" should be generally understood. For example, connection may be a fixed connection, a detachable connection, or an integral connection; may be a mechanical connection, an electric connection, or by laser welding or other technologies; or may be a direct linking, an indirect linking by using an intermediate medium, or an internal communication between two elements. For those skilled in the art, specific meanings of the foregoing terms in the present invention may be understood based on a specific case.

In addition, in the description consistent with the present invention, unless otherwise described, "a plurality of" means two or more than two. An embodiment of an intelligent illuminating system for a vehicle lamp consistent with the present invention is shown in FIG. 1 to FIG. 9.

Figure 2:
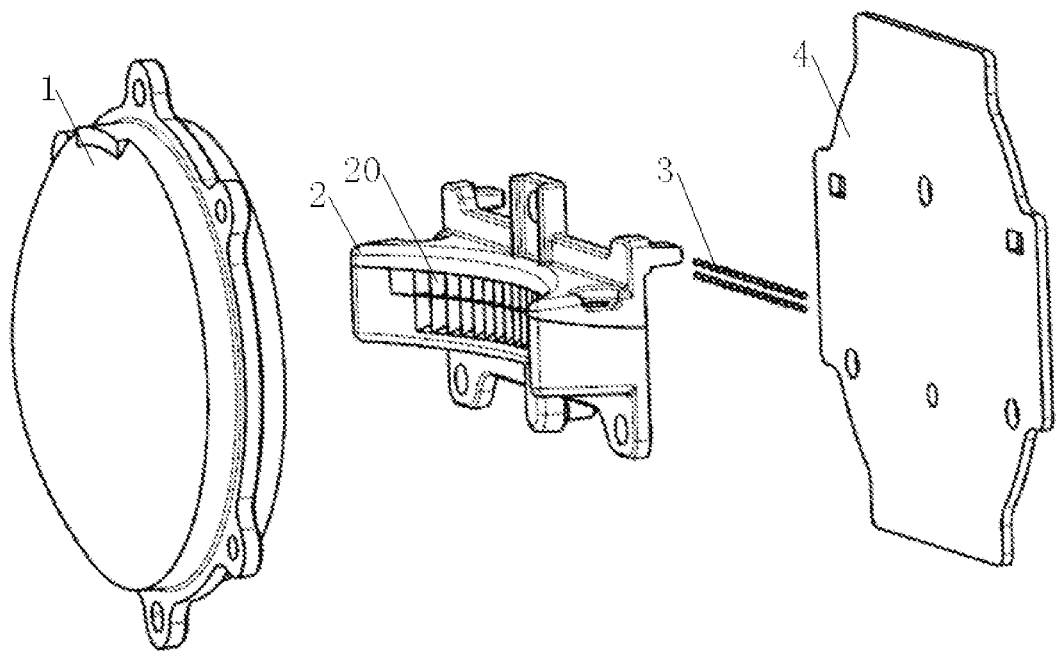
FIG. 2 is a schematic diagram of a separated structure of an intelligent illuminating system for a vehicle lamp according to an embodiment of the present invention.
Figure 3:
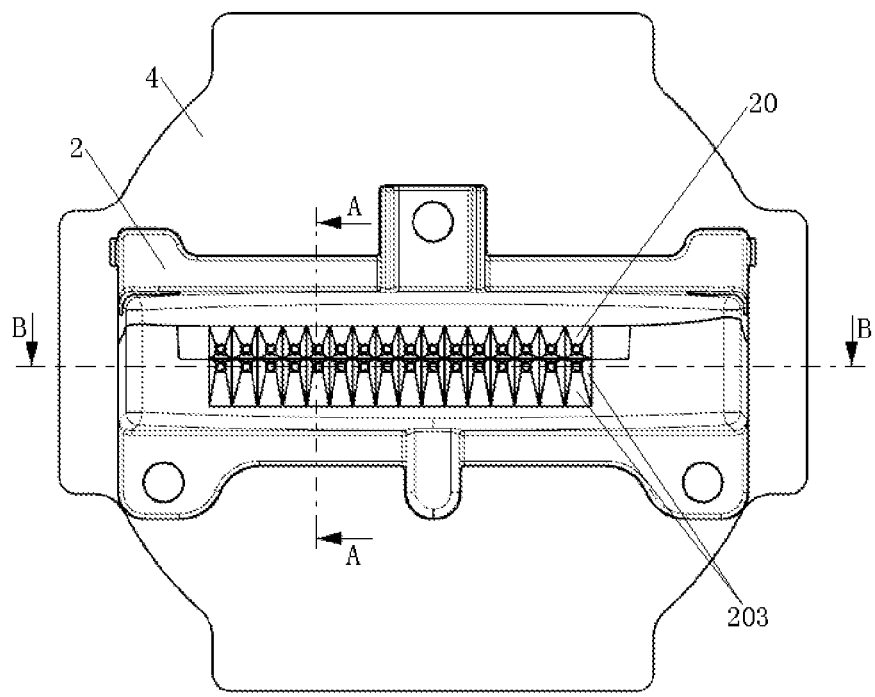
FIG. 3 is a schematic front view of an intelligent illuminating system for a vehicle lamp whose lens is removed according to an embodiment of the present invention.
Figure 4:
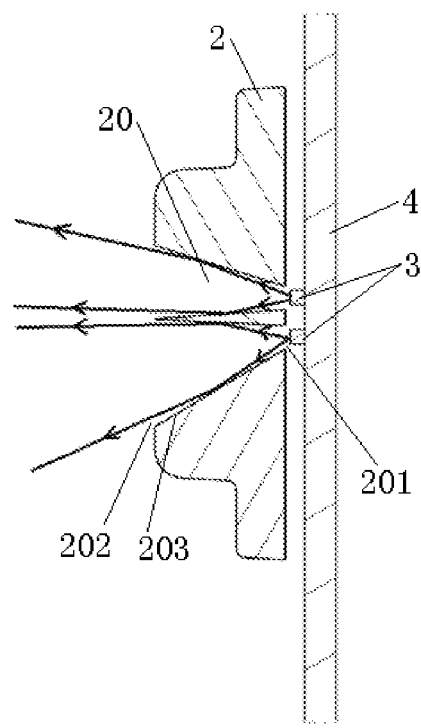
FIG. 4 is a schematic sectional view along A-A in FIG. 3 and a schematic diagram of light paths.
Figure 5:
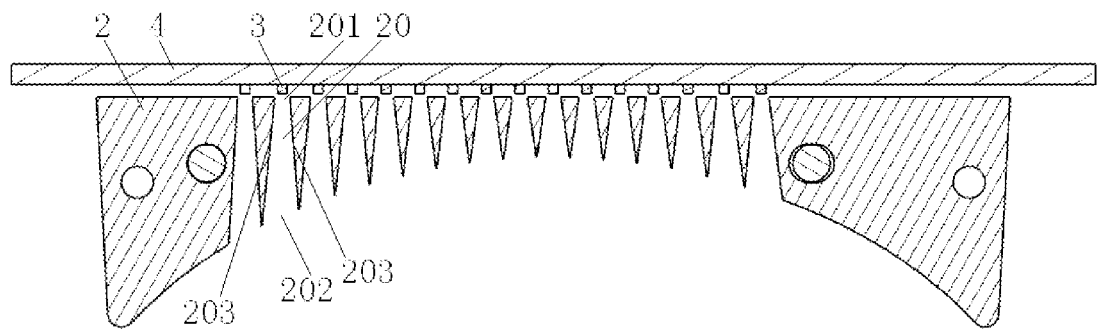
FIG. 5 is a schematic sectional view along B-B in FIG. 3.
Figure 6:
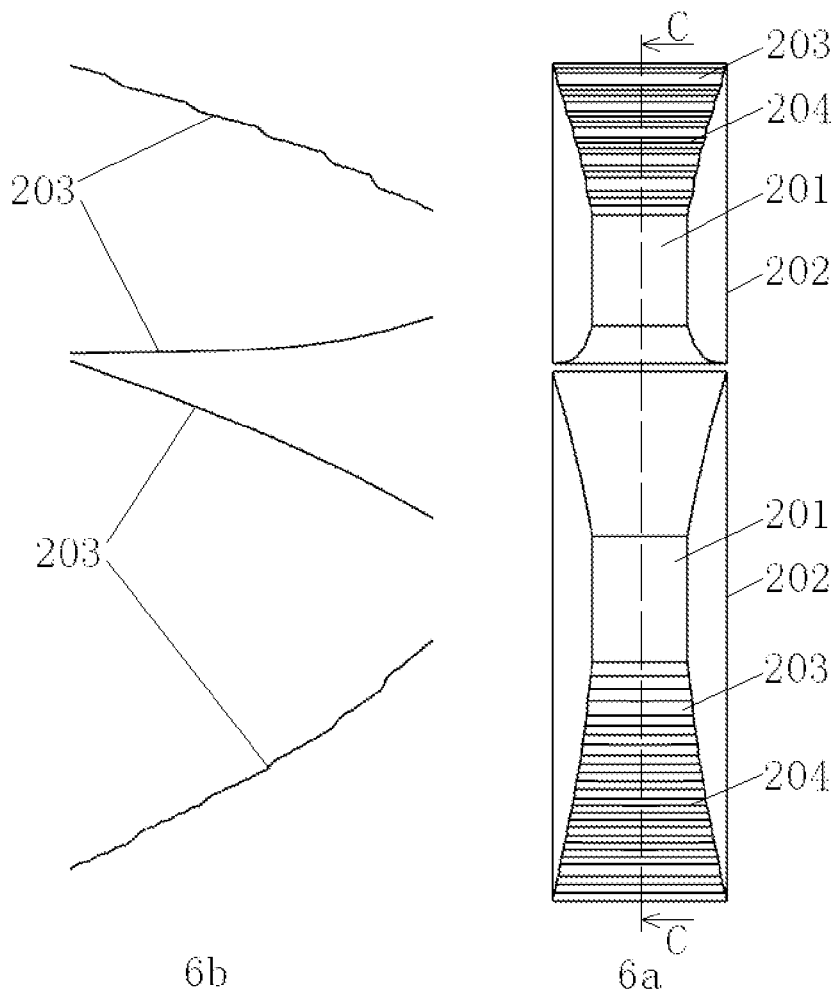
Figure 7:
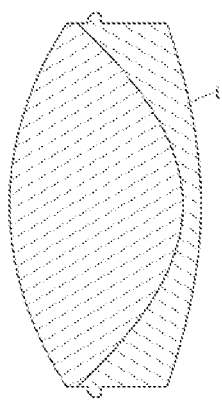
FIG. 7 is a schematic structural diagram of a lens of an intelligent illuminating system for a vehicle lamp when the lens is a balsaming lens according to an embodiment of the present invention.
Figure 8:
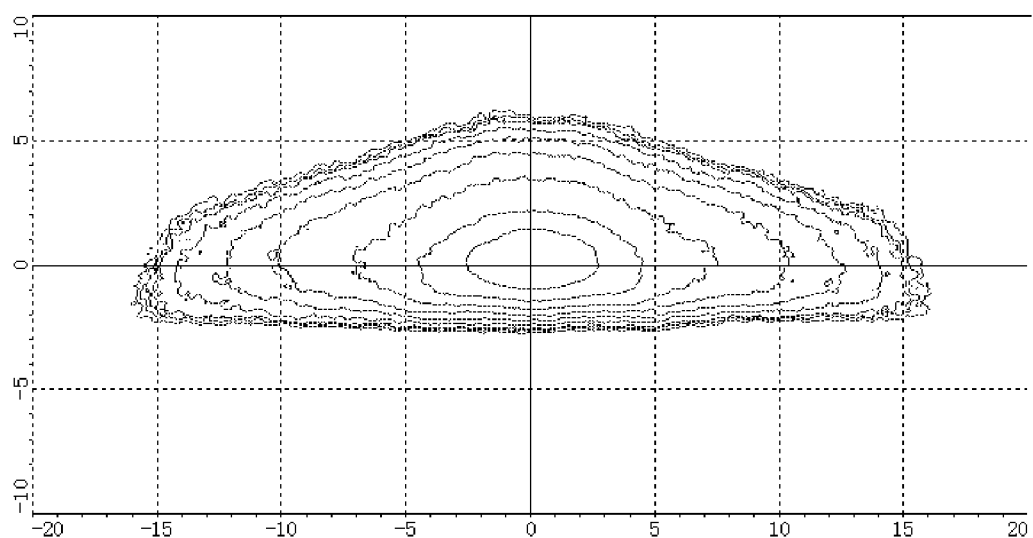
FIG. 8 is a schematic diagram of forming a complete high beam light pattern of an intelligent illuminating system for a vehicle lamp according to an embodiment of the present invention.
Figure 9:
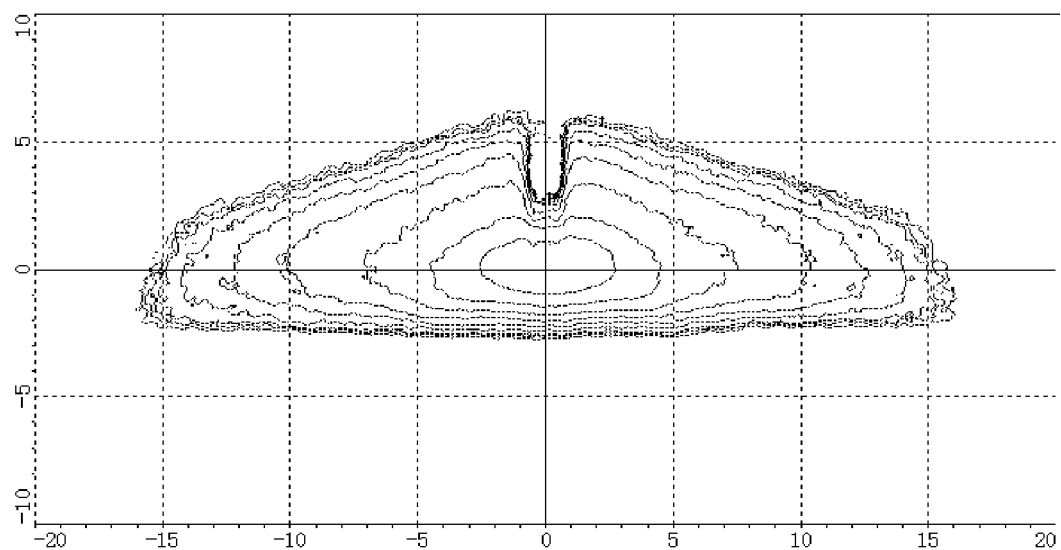
FIG. 9 is a schematic diagram of forming a high beam light pattern with a local loss formed by an intelligent illuminating system for a vehicle lamp according to an embodiment of the present invention.

As shown in FIG. 1 to FIG. 2, the intelligent illuminating system for a vehicle lamp in this embodiment comprises a lens 1, a hollow reflector 2, LED light sources 3, and a circuit board 4. Wherein a plurality of LED light sources 3 are provided, and all the LED light sources 3 are distributed in an array to form an LED light source array. The LED light source array may be provided with a plurality of rows along a transversal direction, and may be provided with a plurality of columns along a longitudinal direction. Neither a specific number of the rows nor that of the columns is limited. Preferably, the LED light source array in this embodiment is provided with two rows along a transversal direction, and is provided with a plurality of columns along a longitudinal direction. All LED light sources 3 are disposed on the circuit board 4. The circuit board 4 is configured to carry the LED light sources 3 to control on and off of each LED light source 3 individually, and can freely adjust luminance of light emitted by each LED light source 3 individually in a range from 0 to 100%. The hollow reflector 2 is disposed between the LED light source array formed by the plurality of LED light sources 3 and the lens 1. The hollow reflector 2 has a plurality of reflection cavities 20. All the reflection cavities 20 are distributed in an array to form a reflection cavity array, and all the reflection cavities 20 are disposed in one-to-one correspondence with all the LED light sources 3. In this embodiment, corresponding to the LED light source array, the reflection cavity array is provided with two rows along a transversal direction, and is provided with a plurality of columns along a longitudinal direction. As shown in FIG. 3, FIG. 4, and FIG. 5, each reflection cavity 20 has an incident opening 201, an emergent opening 202, and a reflection surface 203 extending between the incident opening 201 and the emergent opening 202. The reflection surface 203 has a high reflectivity. Each LED light source 3 is disposed at an incident opening 201 of a corresponding reflection cavity 20. The emergent opening 202 of the reflection cavity 20 is located on a focal plane of the lens 1, or the emergent opening 202 of the reflection cavity 20 has a defocusing amount from the focal plane of the lens 1. That is, the emergent opening 202 of the reflection cavity 20 may be exactly located on the focal plane of the lens 1 or may slightly deviate from the focal plane of the lens 1. Light emitted by an LED light source 3 that is turned on in the LED light source array enters the incident opening 201 of the reflection cavity 20, and one part of the light may be directly incident into the lens 1 through the incident opening 201 and the emergent opening 202; and the other part of the light is incident into the reflection surface 203 of the reflection cavity 20, comes out from the emergent opening 202 of the reflection cavity 20 after being reflected by the reflection surface 203 for one or more times, and is incident into the lens 1. In this way, direct light with a large angle emitted by the LED light source 3 can decrease an emergent angle after being reflected by the reflection cavity 20, and more light can be incident into the lens 1. Two parts of the light incident into the lens 1 overlap with each other and form an illuminating light pattern after being transmitted by the lens 1.

In the intelligent illuminating system for a vehicle lamp in this embodiment, each LED light source 3 and a reflection cavity 20 corresponding to the LED light source 3 form a reflection unit. The LED light sources 3 distributed in an array and the reflection cavities 20 form a reflection unit array. Light emitted by a single reflection unit forms a flare after being transmitted by the lens 1. The flare may be used as a pixel spot of an integer illuminating light pattern formed after light emitted by the reflection unit array is transmitted by the lens 1, thus implementing pixelation of the illuminating light pattern. A flare formed after light emitted by each reflection unit is transmitted by the lens can be individually controlled by individually controlling turning on, turning off and luminance of each LED light source 3. When all the LED light sources 3 are turned on, the light emitted by the reflection unit array forms a complete illuminating light pattern after being transmitted by the lens 1 (referring to FIG. 8); and when one or more LED light sources 3 are turned off or luminance thereof is reduced, a flare formed by the reflection unit corresponding to the LED light source 3 disappears or is darkened, so that an illuminating light pattern with a local loss is formed (referring to FIG. 9). In this way, the intelligent illuminating system for a vehicle lamp in this embodiment can adjust luminance of one or more local areas of an illuminating light pattern, thereby implementing various illuminating light patterns and meeting a self-adaptive requirement of a headlamp. Especially, when a vehicle comes from an opposite direction, an LED light source 3 of a reflection unit forming a flare in an area is turned off by determining the area corresponding to the coming vehicle in the illuminating light pattern. When necessary, luminance of an LED light source 3 of a neighboring reflection unit may further be reduced. Therefore, the illuminating light pattern can be prevented from dazzling a driver of a coming vehicle, and desirable illumination in other areas than the area in which the coming vehicle is located is ensured, thereby ensuring driving safety.

Further, in this embodiment, an inner diameter of the emergent opening 202 of the reflection cavity 20 is greater than an inner diameter of the incident opening 201. The shape of the emergent opening 202 is configured to control an outline of the formed flare. The shapes of the incident opening 201 and the emergent opening 202 both are polygons. In this embodiment, the shapes of the incident opening 201 and the emergent opening 202 both are quadrilaterals. Certainly, the shapes of the incident opening 201 and the emergent opening 202 are not limited in this embodiment and may alternatively be other polygons. The shape of the reflection surface 203 is also not limited. Preferably, side surfaces in the reflection surface 203 that are respectively located at an upper side and a lower side of the LED light source 3 are both free-form curved surfaces, configured to adjust and control the density of distribution of light at the emergent opening 202. More preferably, the free-form curved surface is a quasi-parabolic surface. Further, the side surfaces in the reflection surfaces 203 that are located at the upper side and/or the lower side of the LED light sources 3 are provided with strip patterns 204 extending along a transverse direction. As shown in FIG. 6a and FIG. 6b, the strip pattern 204 extending along a transverse direction may be disposed on a side surface that is in a reflection surface 203 of a reflection cavity 20 located in the upper row and that is located at an upper side of an LED light sources 3, and the strip pattern 204 extending along a transverse direction may be disposed on a side surface that is in a reflection surface 203 of a reflection cavity 20 located in the lower row and that is located at a lower side of an LED light sources 3. Certainly, the strip patterns 204 extending along a transverse direction may alternatively be disposed on the side surfaces that are in the reflection surfaces 203 of all the reflection cavities 20 and that are located at the upper side and the lower side of the LED light sources 3.

Further, in this embodiment, only one or more lenses 1 are provided. A plurality of lenses 1 form a lens set. Preferably, the lens 1 may use a balsaming lens. The balsaming lens is made of two materials of different refractive indexes by using a multiple-color injection molding manufacturing process, and mainly functions for de-dispersion. For a schematic structural diagram of the lens 1, refer to FIG. 7.

Based on the foregoing intelligent illuminating system for a vehicle lamp, this embodiment further provides a vehicle lamp assembly. The vehicle lamp assembly in this embodiment comprises the foregoing intelligent illuminating system for a vehicle lamp in this embodiment.

Based on the foregoing vehicle lamp assembly, this embodiment further provides a vehicle. The vehicle in this embodiment comprises the foregoing vehicle lamp assembly in this embodiment.

In conclusion, in the intelligent illuminating system for a vehicle lamp, the vehicle lamp assembly comprising the intelligent illuminating system for a vehicle lamp, and the vehicle comprising the vehicle lamp assembly, the hollow reflector 2 is disposed between the LED light source array and the lens 1, and direct light with a large angle emitted by the LED light source 3 can decrease an emergent angle after being reflected by the reflection cavity 20 of the hollow reflector 2, so that more light can be incident into the lens 1. A flare formed after light emitted by each reflection unit is transmitted by the lens 1 can be individually controlled by individually controlling turning on, turning off and luminance of each LED light source 3. Therefore, luminance of one or more local areas of an illuminating light pattern can be adjusted. In this way, various illuminating light patterns are implemented and a self-adaptive requirement of a headlamp is met. Especially, when a vehicle comes from an opposite direction, an LED light source 3 of a reflection unit forming a flare in an area is turned off by determining the area corresponding to the coming vehicle in the illuminating light pattern. When necessary, luminance of an LED light source 3 of a neighboring reflection unit may further be reduced. Therefore, the illuminating light pattern can be prevented from dazzling a driver of a coming vehicle, and desirable illumination in other areas than the area in which the coming vehicle is located is ensured, thereby ensuring driving safety. The foregoing descriptions are merely preferred implementations consistent with the present invention. It should be noted that those skilled in the art may make several improvements or substitutions without departing from the principle consistent with the present invention and the improvements or substitutions shall fall within the protection scope consistent with the present invention.

What is claimed is:

1. An intelligent illuminating system for a vehicle lamp, comprising:
   a lens;
   a circuit board (4),
   a plurality of light emitting diode (LED) light sources (3) disposed on the circuit board (4) distributed in an array;
   a hollow reflector (2) disposed between the plurality of LED light sources (3) and the lens (1), wherein the hollow reflector (2) is provided with a plurality of reflection cavities (20), each of the reflection cavities (20) is in one-to-one correspondence with each of the plurality of LED light sources (3), each of the reflection cavities (20) is provided with an incident opening (201), an emergent opening (202), and a reflection surface (203) extending between the incident opening (201) and the emergent opening (202);
   each one of the LED light sources (3) is disposed at its respective incident opening (201), and each one of the emergent openings (202) is located on a focal plane of the lens (1) or has a defocusing amount from the focal plane of the lens (1), and light emitted by each one of the LED light sources (3) is incident into the lens (1) after being reflected by the reflection surface (203);

wherein each one of the reflection surfaces (203) has at least two side surfaces, both side surfaces being free-form curved surfaces, wherein one of the side surfaces is parabolic and the other is quasi-parabolic with an undulating strip pattern extending along the length of the respective reflection cavity (20).

2. The intelligent illuminating system for a vehicle lamp as in claim 1, wherein an inner diameter of the emergent opening (202) is greater than an inner diameter of the incident opening (201).

3. The intelligent illuminating system for a vehicle lamp as in claim 1, wherein the shapes of the incident opening (201) and the emergent opening (202) both are polygons.

4. The intelligent illuminating system for a vehicle lamp as in claim 1, wherein all the LED light sources (3) are distributed in an array and form an LED light source array, the LED light source array is provided with a plurality of rows along a transversal direction and is provided with a plurality of columns along a longitudinal direction.

5. The intelligent illuminating system for a vehicle lamp as in claim 1, wherein one or more lenses (1) are provided.

6. The intelligent illuminating system for a vehicle lamp as in claim 1, wherein the lens (1) is a balsaming lens.

7. A vehicle lamp assembly, comprising the intelligent illuminating system for a vehicle lamp as in claim 1.

8. A vehicle, comprising the vehicle lamp assembly as in claim 7.

\* \* \* \* \*